United States Patent [19]
Cameron

[11] 3,966,227
[45] June 29, 1976

[54] COVER ASSEMBLY FOR AN OCCUPANT RESTRAINT SYSTEM

[75] Inventor: Donald K. Cameron, Fraser, Mich.

[73] Assignee: General Motors Corporation, Detroit, Mich.

[22] Filed: Oct. 24, 1974

[21] Appl. No.: 517,794

[52] U.S. Cl. .................................. 280/752; 180/90
[51] Int. Cl.² ........................................ B60R 21/08
[58] Field of Search ................. 280/150 AB; 180/90

[56] References Cited
UNITED STATES PATENTS

| | | | |
|---|---|---|---|
| 3,588,142 | 6/1971 | Gorman | 280/150 AB |
| 3,632,136 | 1/1972 | Foltz | 280/150 AB |
| 3,640,546 | 2/1972 | Brawn | 280/150 AB |
| 3,794,349 | 2/1974 | Fuller | 280/150 AB |
| 3,801,126 | 4/1974 | Knight | 280/150 AB |
| 3,822,894 | 7/1974 | Muller | 280/150 AB |
| 3,904,222 | 9/1975 | Bursott et al. | 280/150 AB |

FOREIGN PATENTS OR APPLICATIONS

| | | | |
|---|---|---|---|
| 609,624 | 9/1960 | Italy | 280/150 AB |

Primary Examiner—M. H. Wood, Jr.
Assistant Examiner—John P. Silverstrim
Attorney, Agent, or Firm—Herbert Furman

[57] ABSTRACT

An occupant restraint cushion housing is mounted within an instrument panel structure and provided with flanges on the side and upper edges of an elongated opening thereof. An inflatable occupant restraint cushion is housed within the housing. A cover assembly for the housing is secured to the instrument panel structure and includes an integrally hinged closure normally closing an opening in the cover assembly generally co-extensive with that of the housing. Flanges of the cover assembly define the side and upper edges of the opening. The closure is provided with flanges which respectively underlie the flanges of the cover assembly to releasably hold the closure against movement outwardly of the cover assembly until the cushion is inflated. Ribs on the side edge flanges of the closure engage flanges of the housing to block inward movement of the side edges of the closure. The flange on the upper edge of the closure engages a filler member secured to a flange of the housing to block inward movement of the upper edge of the closure. Juxtaposed shoulders on the closure and filler member releasably block inward sliding movement of the upper edge of the closure relative to the filler member.

1 Claim, 4 Drawing Figures

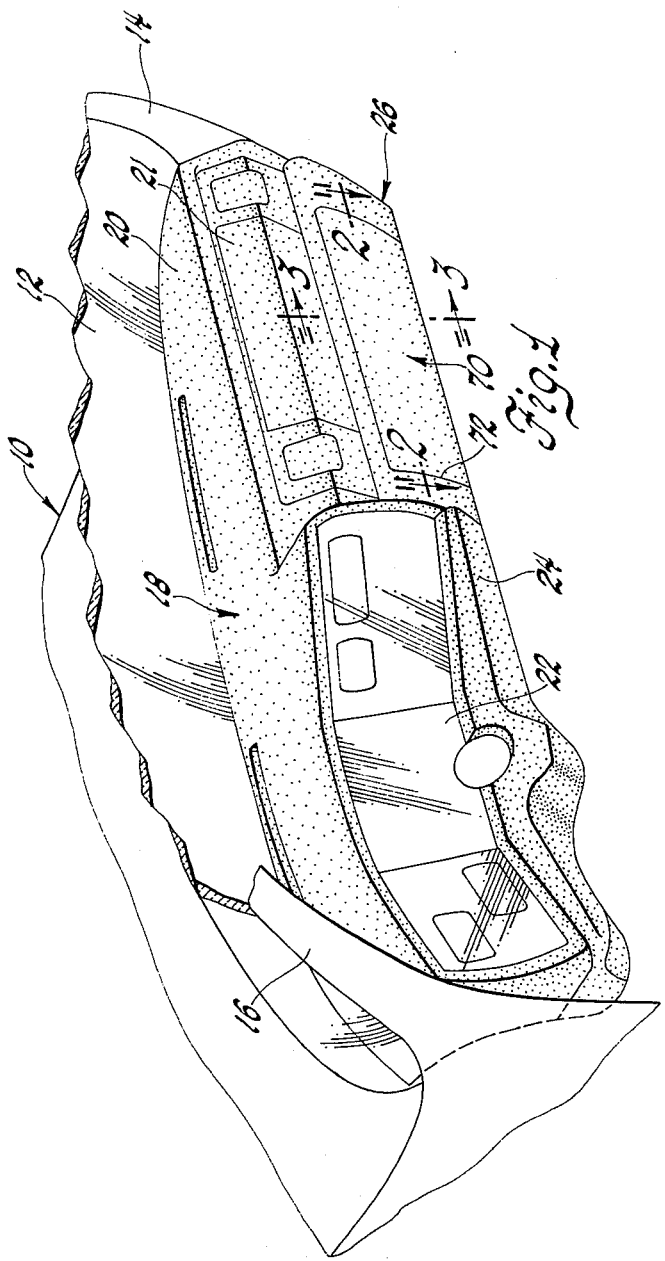
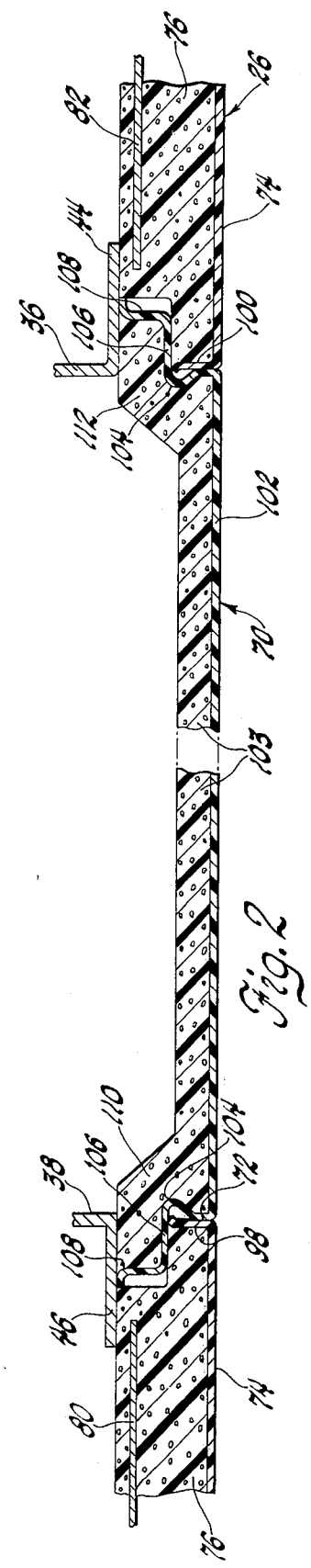

COVER ASSEMBLY FOR AN OCCUPANT RESTRAINT SYSTEM

This invention relates generally to a cover assembly for an occupant restraint system and more particularly to an improved interlock arrangement for the closure of such an assembly to block movement of the closure inwardly of the closure opening of the assembly.

The cover assembly of this invention is an improvement of that shown in Ser. No. 420,798 Bursott et al filed Dec. 3, 1973 (now U.S. Pat. No. 3,904,222) and assigned to the assignee of this invention.

The cover assembly of this invention includes an outer member of semi-rigid thin plastic material and an inner layer of foam plastic which cooperatively provide flanges defining the side and upper edge portions of an elongated opening therethrough for cushion deployment. A closure for the opening includes an outer member and inner layer formed integral with those of the cover assembly along the lower edge portion of the opening to integrally hinge the closure to the cover assembly. The outer member and inner layer cooperatively provide generally inwardly offset flanges along the free side and upper edge portions of the closure. These flanges underlie the flanges of the cover assembly to releasably hold the closure against movement outward of the cover assembly until the cushion is deployed. In order to maintain the closure coplanar of the assembly, the offset side flanges are provided with integral ribs which resiliently engage flanges of the occupant restraint cushion housing to block movement of the side edge portions of the closure inwardly of the opening. A generally U-shaped filler strip has one leg thereof secured to a flange of the restraint cushion housing. The other leg thereof resiliently engages the offset upper flange of the closure. The filler strip includes an offset integral rib or shoulder at the bight thereof which underlies a shoulder of the closure to releasably interlock the filler strip and closure. The interlock provided by the abutting shoulders resists relative sliding movement between the offset upper flange of the closure and the filler strip which is resiliently engaged by this flange.

Thus, the free side and upper edge portions of the closure are blocked against movement inwardly of the cover assembly opening and releasably held against movement outwardly of the opening. Additionally, the upper edge portion of the closure is interlocked with the restraint cushion housing to resist inward sliding movement of this edge portion relative to the cover assembly and aid in blocking movement of the closure inwardly of the cover assembly opening.

The primary feature of this invention is to provide an improved cover assembly for vehicle body occupant restraint systems wherein an outwardly swinging closure for the deployment opening of the cover assembly is blocked against movement inwardly of the opening by coacting elements between the closure and fixed vehicle structure, with such elements additionally providing an interlock resisting relative sliding movement therebetween.

This and other features of the invention will be apparent from the following drawings wherein:

FIG. 1 is a perspective view of the instrument panel of a vehicle body having an occupant restraint system and including a cover assembly according to this invention;

FIG. 2 is an enlarged sectional view taken generally along the plane indicated by line 2—2 of FIG. 1;

Figure 3:
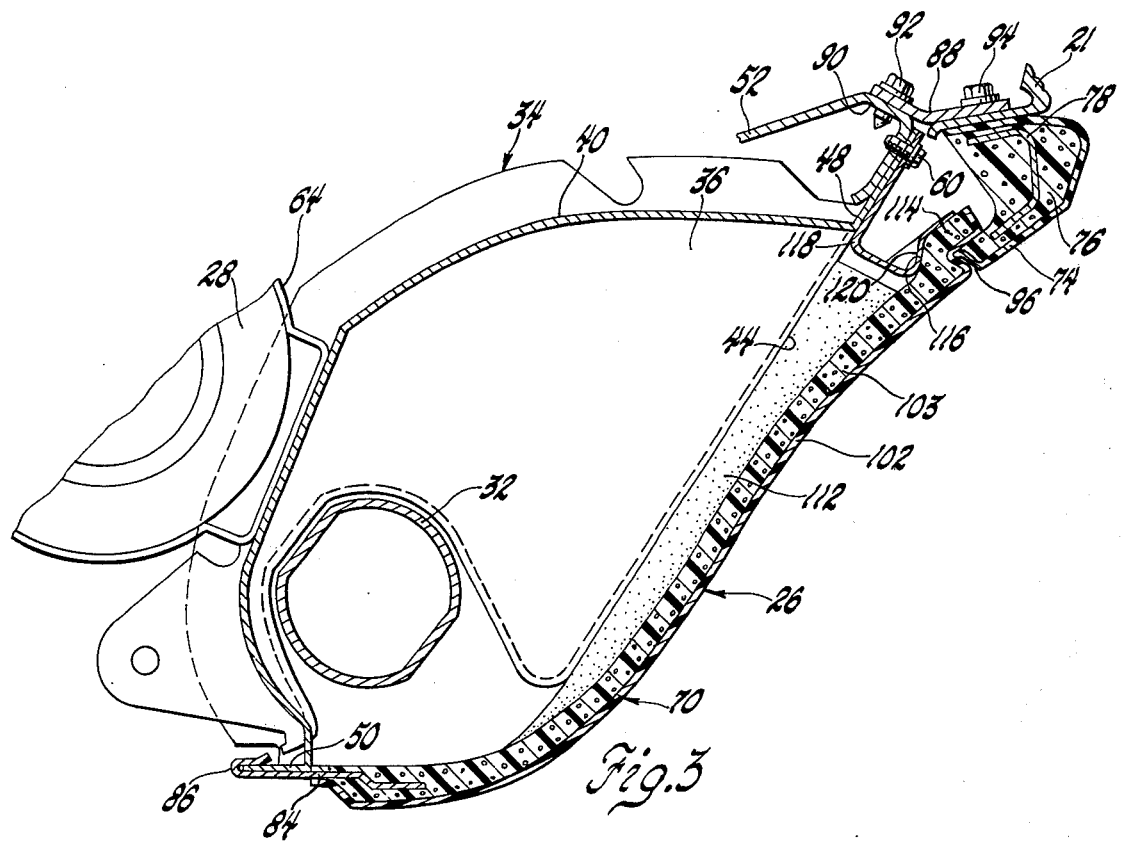
FIG. 3 is an enlarged sectional view taken generally along the plane indicated by line 3—3 of FIG. 1.

Referring now particularly to FIG. 1 of the drawings, a vehicle body designated generally 10 includes a windshield 12 supported in a conventional manner on the cowl structure of the body and framed by right-hand and left-hand windshield pillars 14 and 16 which are formed as part of the respective hinge pillar structures of the body. The body further includes an instrument panel designated generally 18 and including an upper pad portion 20, a passenger console portion 21, a driver console portion 22, and a knee restraint 24. The knee restraint is similar to that shown and described in copending applications Arntson et al Ser. No. 276,084, filed July 28, 1972, and Arntson et al Ser. No. 406,262, filed Oct. 15, 1973.

A cover assembly 26 covers the passenger occupant restraint cushion system which is housed within the instrument panel 18 at the right-hand side thereof and generally below the console portion 21.

This system forms no part of this invention. Generally, as shown in FIG. 4, the system includes an inflator 28 which supplies pressure fluid through a manifold 30 to a diffuser 32. The diffuser 32 diffuses the pressure fluid to the occupant restraint cushion assembly, not shown, for deployment thereof. The diffuser and cushion assembly are housed within an open housing 34 which includes right-hand and left-hand side plates 36 and 38, respectively, and a generally U-shaped reaction plate 40 secured to plates 36 and 38. Reference may be had to U.S. Pat. No. 3,797,856—Matthews, Occupant Restraint System, issued Mar. 19, 1974 and U.S. Pat. No. 3,791,671—Zens, Occupant Restraint System, issued Feb. 12, 1974, for further details. The plate 36 includes a lateral flange 44 and the plate 38 includes a lateral flange 46. Plate 40 further includes a lateral flange 48 at its upper edge portion and a flange 50, FIG. 3, at its lower edge portion.

The instrument panel support structure includes a tie bar 52 having its outboard end welded to a bracket 54 which is secured to the right-hand hinge pillar of the body. The inboard end of tie bar 52 is secured to a bracket 56 which extends forwardly of the instrument panel structure and is secured to the cowl structure of the body at approximately the midpoint thereof. A reinforcement bracket 58 may be used to additionally support the bracket 56. The tie bar is thus supported on the body in a rigid fixed manner between the right-hand hinge pillar and the forward body wall and extends generally transversely of the body at approximately the upper edge of the cover assembly 26 and the lower edge of console portion 21.

The upper flange 48 of housing 34 is secured to the tie bar 52 by a number of bolts 60. Additionally, flange 46 of end plate 38 is secured by bolts 62 to an apertured flange of bracket 56. The inflator 28 is supported to the housing 34 by a bracket 64, which is welded to plate 40 and clamps to the inflator through a bolt connection 66. The inflator is additionally secured to the forward body wall by a bracket 68 which is bolted at 66 to the bracket 64 and extends forwardly to the forward body wall or to rigid bracket structure extending therefrom.

Figure 4:
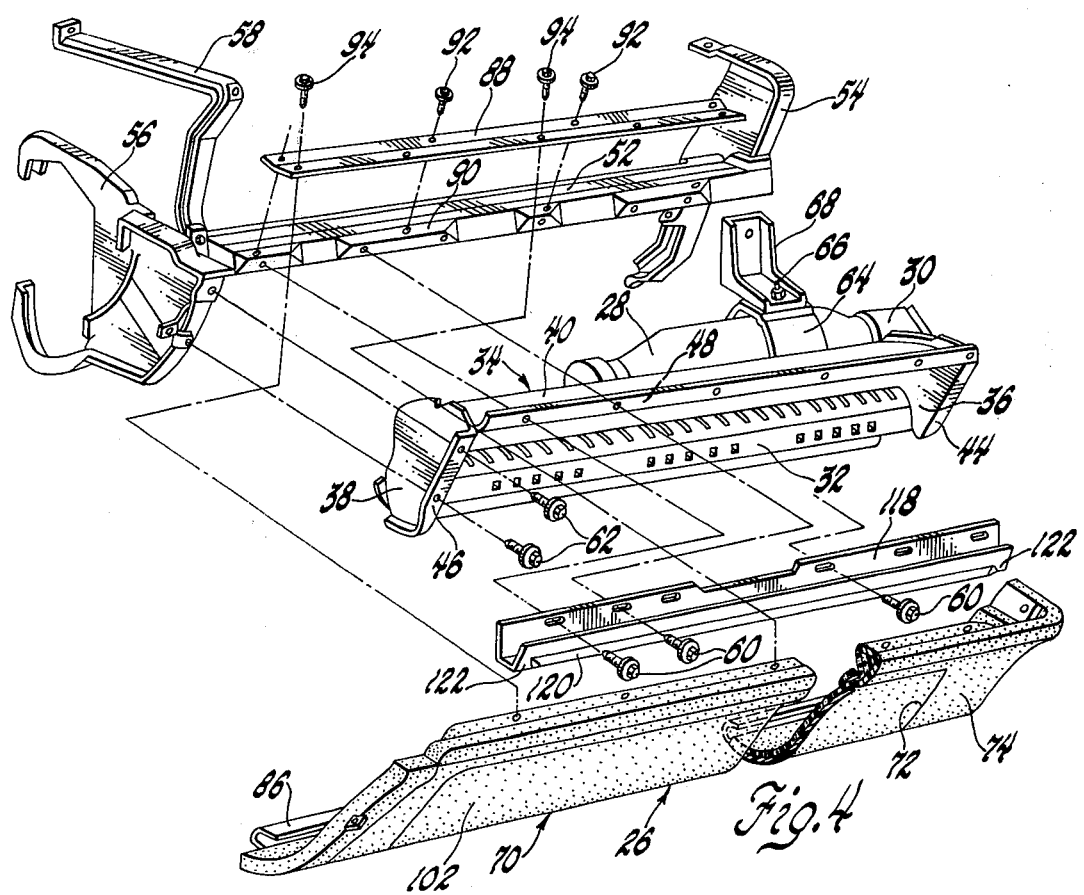
FIG. 4 is a perspective view of a portion of FIG. 1.

With reference now to FIGS. 2, 3 and 4, the cover assembly 26 includes a closure 70 which is integrally hinged at its lower edge to the cover assembly, as will be described, for downward swinging movement to an open position with respect to an opening 72 upon inflation of the cushion assembly to permit deployment of the cushion assembly therethrough. The opening 72 is generally coextensive of the opening of the housing 34 as defined by the flanges 44 and 46 of the side plates 36 and 38, respectively, and flange 48 of the reaction plate 40.

Generally the cover assembly includes an outer member or sheet 74 of thin semi-rigid plastic material. An inner layer 76 of cast foam, such as cast urethane, is secured to the outer member. A reinforcement member 78 is provided within the inner layer 76 across the upper edge of opening 72 and is secured to the upper ends of side edge reinforcement members 80 and 82, FIG. 2, which extend along the side edges of opening 72 within the inner layer 76. The lower ends of these reinforcement members are secured to a lower reinforcement member 84 which extends across the lower edge of the cover assembly. Member 84 extends partially outside of the inner layer 76 and includes a hook portion 86 which hooks over flange 50 to releasably secure the lower edge of the cover assembly to the housing 34.

An elongated support bracket 88 seats on embossments 90 of tie bar 52 and is bolted thereto at 92. The upper edge portion of the cover assembly and the console portion 21 are jointly secured to bracket 88 at 94.

The outer member 74 includes laterally inwardly extending flanges 96, 98 and 100, FIGS. 2 and 3, which define respectively the upper, left-hand, and right-hand side edges of the opening 72.

The closure 70 includes an outer sheet or member 102 and an inner layer 103 which are formed integral with member 74 and layer 76 as shown in FIG. 3 along the lower edge portion of the opening and of the closure to integrally hinge the closure 70 to the cover assembly for downward swinging movement outwardly of the opening 72 when the cushion is deployed. The member 102 includes lateral flanges 104, 106 and 108, FIGS. 2 and 3, at its side and upper edges. Flanges 104 are juxtaposed to the flanges 96, 98 and 100. The flanges 106 underlie the inner layer 76 of the cover assembly while flanges 108 are juxtaposed to flanges of this inner layer.

The overlapping relationship of flanges 106 and the inner layer 76 releasably holds the closure 70 in closed position against movement outwardly of the opening 72. As shown in FIGS. 2 and 3, the flanges 96, 98 and 100 have their free edges slightly laterally offset and such offset free edges are received within shallow grooves formed in flanges 104 to additionally aid in releasably holding the closure 70 in closed position.

The closure 70 is moved to an open position by swinging downwardly about its lower edge portion when the cushion housed within the housing 34 is inflated. As the cushion inflates, the pressure of the cushion against the closure bulges the closure outwardly until the flanges 106 slip past the inner layer 76 of the cover assembly. This bulging or distortion of the closure is aided by the flexibility of the outer member 102 and of the inner layer 103 thereof. The reinforcement members 78, 80 and 82 reinforce the upper and side edges of the cover assembly around the opening 72 to aid in movement of the closure 76 to its open position. The reinforcement member 84 reinforces the integral hinge between the cover assembly and the closure 70 and mounts the lower edge of the cover assembly to the housing 34. While only the upper and lower edges of the cover assembly have been described as being secured to fixed body structure, the right-hand and left-hand edges of the cover assembly may likewise be secured to the hinge pillar structure and to the knee restraint in conventional manner if so desired.

The cover assembly 26, in addition to its functions with respect to the restraint cushion, also functions to complete the instrument panel of the body. Thus, it should blend in with and follow the contours of the instrument panel and particularly the console portion 21 thereof. While the overlapping flange arrangement between the closure and cover assembly releasably holds the closure in closed position against outward movement, it is possible for someone to press against the closure and move the closure inwardly of the cover assembly unless the closure is backed up or supported against such movement. In order to accomplish this, the inner layer 103 along the flanges 106 at the side edge portions of the closure is thickened to provide ribs 110 and 112 which respectively seat against the flanges 46 and 44 of the housing 34 to back up or support the side edges of the closure against movement inwardly of the opening 72.

As best shown in FIG. 3, the inner layer 103 along the upper edge of the closure is thickened to provide a rib 114 having a shoulder 116. A generally U-shaped filler member 118 has its forward leg secured to tie bar 52 by bolts 60. The rearward leg thereof is resiliently engaged by rib 114 to back up or support the upper edge of the closure against movement inwardly of the cover assembly. In accordance with this invention, the filler member is provided with an integral rib or shoulder 120 which engages shoulder 116 to interlock the upper edge of the closure and the cover assembly against relative sliding movement. This relative sliding movement occurs both when the closure bulges outwardly on cushion inflation and when the cushion bulges inwardly when someone presses on it. The abutting shoulders 116 and 120 function in both instances to resist relative sliding movement between the upper edge of the closure and the cover assembly. The interlock is easily overcome by cushion pressure upon inflation thereof and is more effective upon manual pressure applied to the closure.

With reference to FIG. 3, it will be noted that rib 112, and likewise rib 110, terminates below rib 114. As shown in FIG. 4, the ends of member 118 are flattened at 122. The flattened ends 122 engage rib 114 adjacent ribs 110 and 112. The filler member 118 terminates immediately adjacent the ribs 110 and 112.

Thus, this invention provides an improved interlock arrangement for the closure of an occupant restraint system cover assembly.

I claim:

1. In a vehicle body having an instrument panel structure, an occupant restraint cushion housing, an inflatable occupant restraint cushion deployable from the housing, a cover assembly mounted on the instrument panel structure and including flanges defining the side and upper edge portions of an opening to the housing, a flexible closure hinged to the lower edge portion of the opening for movement to an open position, and including flanges underlying the cover assembly flanges to releasably hold the closure against such movement, the flanges at the side edge portions of the closure engaging the housing to block lateral movement of the side edge portions of the closure inwardly of the opening under inward pressure applied thereto, the improvement comprising, an elongated filler member secured to the housing and including an elongated shoulder extending angularly to the plane of the opening, said filler member also including an adjacent flange juxtaposed to the upper edge flange of the cover assembly and resiliently clamping the upper edge flange of the closure therebetween, and an elongated shoulder on the closure adjacent the upper edge flange thereof engaging the angular filler member shoulder to resist sliding movement in the general plane of the opening of the closure upper edge flange relative to the filler member flange under both inward and outward pressure applied to the closure, movement of the closure to an open position by deployment of the cushion forcing the closure shoulder past the filler member shoulder angularly and outwardly of the plane of the opening.

* * * * *